(12) United States Patent
Bednar et al.

(10) Patent No.: US 11,120,650 B2
(45) Date of Patent: Sep. 14, 2021

(54) METHOD AND SYSTEM FOR SENDING VEHICLE HEALTH REPORT

(71) Applicant: FORD GLOBAL TECHNOLOGIES, LLC, Dearborn, MI (US)

(72) Inventors: Chad Bednar, Royal Oak, MI (US); Erik J. Christen, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 577 days.

(21) Appl. No.: 15/704,277

(22) Filed: Sep. 14, 2017

(65) Prior Publication Data

US 2019/0080528 A1    Mar. 14, 2019

(51) Int. Cl.
| | |
|---|---|
| *G01M 17/00* | (2006.01) |
| *G07C 5/08* | (2006.01) |
| *G07C 5/00* | (2006.01) |
| *B60R 16/023* | (2006.01) |
| *H04L 29/08* | (2006.01) |
| *H04W 4/38* | (2018.01) |
| *H04W 4/44* | (2018.01) |
| *H04L 12/40* | (2006.01) |

(52) U.S. Cl.
CPC .......... *G07C 5/085* (2013.01); *B60R 16/0234* (2013.01); *G07C 5/006* (2013.01); *G07C 5/008* (2013.01); *H04L 67/025* (2013.01); *H04W 4/38* (2018.02); *H04W 4/44* (2018.02); *H04L 67/12* (2013.01); *H04L 2012/40273* (2013.01)

(58) Field of Classification Search
None
See application file for complete search history.

(56) References Cited

U.S. PATENT DOCUMENTS

| | | | |
|---|---|---|---|
| 6,665,085 B1 | 12/2003 | Edmunds et al. | |
| 6,735,505 B2 | 5/2004 | Levine | |
| 9,524,592 B2 | 12/2016 | Jones et al. | |
| 2003/0152145 A1 | 8/2003 | Kawakita | |
| 2011/0039528 A1* | 2/2011 | Yi | G08G 1/20 455/418 |
| 2016/0055116 A1* | 2/2016 | Duer | H04W 4/80 710/105 |
| 2017/0109947 A1 | 4/2017 | Prokhorov | |
| 2019/0080528 A1* | 3/2019 | Bednar | G07C 5/006 |

OTHER PUBLICATIONS

Monitor Your Vehicle's Health With SYNC® Vehicle Health Alerts & Vehicle Health Report, retrieved from https://owner.lincoln.com/tools/account/maintenance/keep-your-vehicle-healthy.html on Jun. 26, 2019.

* cited by examiner

*Primary Examiner* — Adam M Alharbi
(74) *Attorney, Agent, or Firm* — Michael J. Spenner; Brooks Kushman P.C.

(57) ABSTRACT

Vehicle bus data is collected from an electronic control unit. User input is received to initiate creation of a vehicle health report for describing a vehicle diagnostic event. A voice message descriptive of a context of the diagnostic event is recorded. The telematics controller sends, to a sever, the vehicle health report including the voice message and a subset of the vehicle bus data including a time of the user input.

18 Claims, 5 Drawing Sheets

METHOD AND SYSTEM FOR SENDING VEHICLE HEALTH REPORT

TECHNICAL FIELD

The present disclosure is generally related to a method and system for sending vehicle data along with a user message to a server.

BACKGROUND

Many modern vehicles are equipped with systems that detect potential malfunctions on various components. A diagnostic tool may be connected to the vehicle to read out information regarding any detected malfunctions. Some vehicles may also send vehicle health reports to manufacturers to allow technicians to analyze when issues are detected.

SUMMARY

In one or more illustrative embodiments, a method includes collecting vehicle bus data from an electronic control unit; receiving user input to initiate creation of a vehicle health report for describing a vehicle diagnostic event; recording a voice message descriptive of a context of the diagnostic event; and sending, by a telematics controller to a server, the vehicle health report including the voice message and a subset of the vehicle bus data including a time of the user input.

In one or more illustrative embodiments, a method for sending a vehicle health report, includes monitoring an operation of a vehicle by an electronic control unit (ECU); initiating a reporting process responsive to detecting a diagnostic message generated by the ECU; collecting vehicle data from the ECU by a vehicle processor; storing the vehicle data in a storage; requesting a user to record a user message via a human machine interface (HMI); recording the user message by an input device; and sending the vehicle health report, including both the vehicle data and the user message, to a server by a communication device.

In one or more illustrative embodiments, a vehicle includes a plurality of ECUs, in communication over a vehicle bus, configured to monitor operation of the vehicle; and a processor in communication with the vehicle bus, programmed to send, to a server, a vehicle health report including a voice message recorded from a vehicle occupant descriptive of a context of a vehicle diagnostic event and a subset of vehicle bus data including a time of an issue input.

The details of one or more implementations are set forth in the accompanying drawings and the description below. Other features and advantages will become apparent from the description, the drawings, and the claims.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programed to perform any number of the functions as disclosed.

A vehicle diagnostic system may identify a vehicle issue, and a technician may review the issue to attempt to identify a root cause. However, identifying a resolution for the issue may be inefficient in some instances, because technicians lack access to contextual information (e.g., weather, road conditions, etc.) at the time the issue is detected. Vehicle occupants generally have better knowledge of the context surrounding the issue, but lack an efficient way to provide such information to the technician. The present disclosure, among other things, proposes vehicular systems and methods for collecting information from vehicle occupants and from vehicle systems, and transmitting such information to servers for review.

Figure 1A:
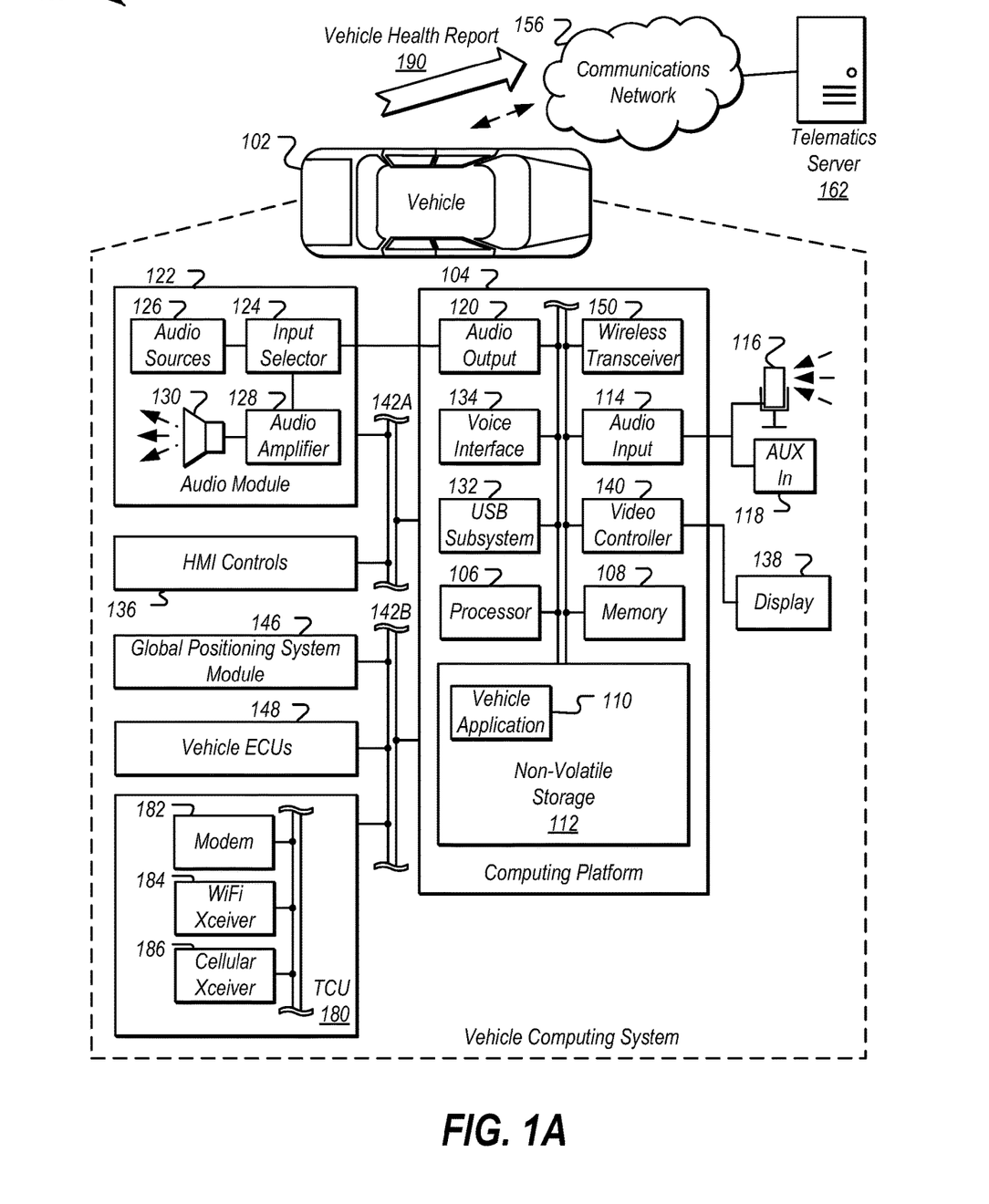
FIG. 1A illustrates an exemplary block topology of a vehicle system of one embodiment of the present disclosure.

FIG. 1A illustrates an example diagram of a system 100 that may be used to provide telematics services to vehicle 102. The vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or move electric motors, such as a series hybrid electric vehicle (SHEV), a parallel hybrid electric vehicle (PHEV), or a parallel/series hybrid vehicle (PSHEV), a boat, a plane or other mobile machine for transporting people or goods. Telematics services may include, as some non-limiting possibilities, navigation, turn-by-turn direction, vehicle health report, local business search, accident reporting, and hands-free calling. In an example, the system 100 may include the SYNC system manufactured by The Ford Motor Company of Dearborn, Mich. It should be noted that the illustrated system 100 is merely an example, and more, fewer, and/or differently located elements may be used.

The computing platform 104 may include one or more processors 106 configured to perform instructions, commands, and other routines in support of the processes described herein. For instance, the computing platform 104 may be configured to execute instructions of vehicle applications 110 to provide features such as navigation, accident reporting, vehicle health reporting, satellite radio decoding, and hands-free calling. Such instructions and other data may be maintained in non-volatile manner using a variety of types of computer-readable storage medium 112. The computer-readable medium 112 (also referred to as a processor-readable medium or storage) includes any non-transitory medium (e.g., tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants/users to interface with the computing platform 104. For example, the computing platform 104 may include an audio input 114 configured to receive spoken commands from vehicle occupants through a connected microphone 116, and an auxiliary (AUX) audio input 118 configured to receive audio signals from connected devices. The auxiliary audio input 118 may be a physical connection, such as an electrical wire or a fiber optic cable, or a wireless input, such as a Bluetooth audio connection. In some examples, the audio input 114 may be configured to provide audio processing capabilities, such as pre-amplification of low-level signals, and conversion of analog input into digital data from processing by the processor 106.

The computing platform 104 may also provide one or more audio outputs 120 to an input of an audio module 122 having audio playback functionality. In other examples, the computing platform 104 may provide the audio output to an occupant through use of one or more dedicated speakers (not illustrated). The audio module 122 may include an input selector 124 configured to provide audio content from a selected audio source 126 to an audio amplifier 128 for playback through vehicle speakers 130 or headphones (not illustrated). The audio sources 126 may include, as some examples, decoded amplitude modulated (AM) or frequency modulated (FM) radio signals, and audio signals from compact disc (CD) or digital versatile disk (DVD) audio playback. The audio sources 126 may also include audio received from the computing platform 104, such as audio content generated by the computing platform 104, audio content decoded from flash memory drives connected to a universal serial bus (USB) subsystem 132 of the computing platform 104, and audio content passed through the computing platform 104 from the auxiliary audio input 118.

The computing platform 104 may utilize a voice interface 134 to provide a hands-free interface to the computing platform 104. The voice interface 134 may support speech recognition from audio received via the microphone 116 or auxiliary audio input 118 according to grammar associated with available commands, and voice prompt generation for output via the audio module 122. In some cases, the system may be configured to temporarily mute or otherwise override the audio source specified by the input selector 124 when an audio prompt is ready for presentation by the computing platform 104 and another audio source 126 is selected for playback.

The computing platform 104 may also receive input from human-machine interface (HMI) controls 136 configured to provide for occupant interaction with the vehicle 102. For instance, the computing platform 104 may interface with one or more buttons (not shown) or other HMI controls configured to invoke functions on the computing platform 104 (e.g., steering wheel audio buttons, a push-to-talk button, instrument panel controls, etc.). The computing platform 104 may also drive or otherwise communicate with one or more displays 138 configured to provide visual output to vehicle occupants by way of a video controller 140. In some cases, the display 138 may be a touch screen further configured to receive user touch input via the video controller 140, while in other cases the display 138 may be a display only, without touch input capabilities.

The computing platform 104 may be further configured to communicate with other components of the vehicle 102 via one or more in-vehicle networks 142 (142A, 142B, 142C). The in-vehicle network 142 may include, but is not limited to, one or more of a controller area network (CAN), an Ethernet network, and a media oriented system transport (MOST), as some examples. The in-vehicle network 142 may allow the computing platform 104 to communicate with other vehicle systems, such as a telematics control unit (TCU) 180.

A global positioning system (GPS) module 146, and various vehicle ECUs 148 are configured to cooperate with the computing platform 104. As some non-limiting possibilities, the vehicle ECUs 148 may include a powertrain control module configured to provide control of engine operating components (e.g. idle control components, fuel delivery components, emissions control components, etc.) and monitoring of engine operating components (e.g., status of engine diagnostic codes); a transmission control unit configured to control the upshift and downshift of the automatic vehicle transmission and monitor the operation of the transmission; an anti-lock braking system (ABS) controller configured to allow the wheels to maintain traction with the road surface according to driver inputs while braking, which also includes, but is not limited to, a traction control system (TCS), an electronic brakeforce distribution (EBD) module, and/or an electronic stability control (ESC) module, all of which are configured to monitor and maintain vehicle operation safety; a body control module configured to manage various power control functions such as exterior lighting, interior lighting, keyless entry, remote start, and point of access status verification (e.g., closure status of the hood, doors and/or trunk of the vehicle 102); a radio transceiver module configured to communicate with key fobs or other local vehicle devices; and a climate control management module configured to provide control and monitoring of heating and cooling system components (e.g., compressor clutch and blower fan control, temperature sensor information, etc.).

Each ECU 148 may have an internal memory configured to store vehicle data on a temporary basis. This vehicle data may be loaded and used for analysis by technicians for inspection and troubleshooting purposes. The ECUs 148 may be configured to communicate the vehicle data to the computing platform 104 in real time via the in-vehicle network 142B, and the computing platform 104 may store the vehicle data in the storage 112. In many examples, the computing platform 104 has a greater storage capacity (e.g., via storage 112) as compared to the ECUs 148. Accordingly, and as explained in greater detail below, the computing platform 104 may be used to allow the vehicle 102 to store data for analysis.

The audio module 122 and the HMI controls 136 may communicate with the computing platform 104 over a first in-vehicle network 142A, the GPS module 146 and vehicle ECUs 148 may communicate with the computing platform 104 over a second in-vehicle network 142B, and the TCU 180 may communicate with the computing platform 104 over a third in-vehicle network 142C. Additionally or alternatively, one or more HMI controls 136, ECUs 148 and/or other components may be connected to the computing platform 104 via different in-vehicle network 142 than shown, or directly without connection to an in-vehicle network 142.

The computing platform 104 may be configured to communicate with the TCU 180 via in-vehicle network 142C. The TCU 180 may include a modem 182, a Wi-Fi module 184, and a cellular module 186, all of which may be collectively configured to wirelessly communicate with a communications network 156. Alternatively, the Wi-Fi module 184 may be configured to communicate with the wireless transceiver 150 of the computing platform 104.

The communication network 156 may provide communication services, such as packet-switched network services (e.g. Internet access, VoIP communication services), to devices connected thereto. As an example, the communications network 156 may include a cellular telephone network. The TCU 180 may provide network connectivity to the communications network 156 via the modem 182 and/or the cellular module 186. As an alternative example, the communications network 156 may include a Wi-Fi network. The TCU 180 may provide network connectivity to the communications network via the Wi-Fi module 184. To facilitate the communication over the communications network 156, the TCU 180 may be associated with unique device identifiers (e.g. mobile device numbers (MDNs), Internet protocol (IP) addresses, etc.) to identify the communications of the TCU 180 over the communications network 156. When the TCU 180 is connected to the communications network 156, the TCU 180 may allow the computing platform 104 to use the network connectivity to communicate over the communications network 156 with a remote telematics service 162. As an example, the remote telematics service may include a computer server operated and used by the vehicle manufacturer.

Figure 1B:
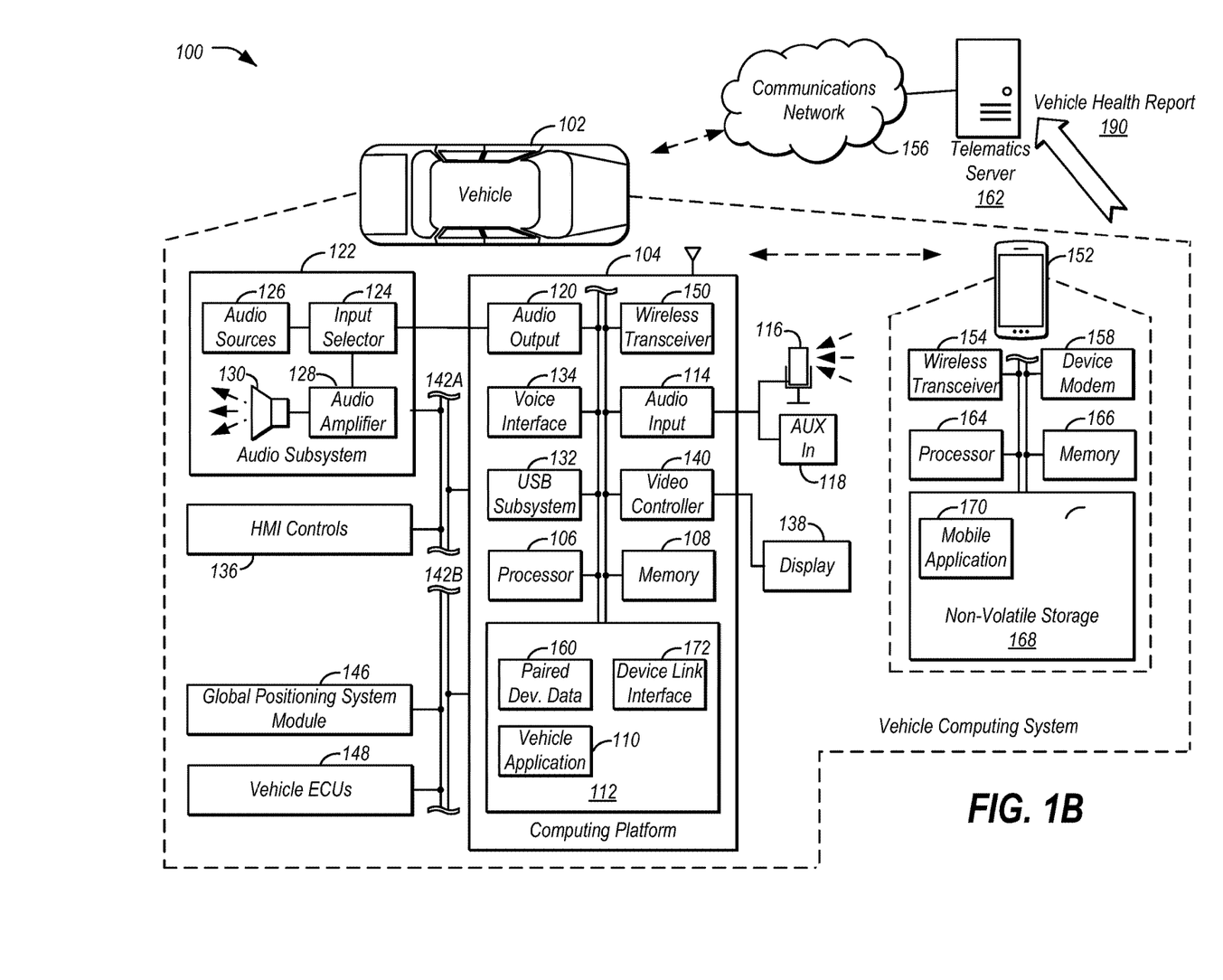
FIG. 1B illustrates an alternative exemplary block topology of a vehicle system of one embodiment of the present disclosure.

Additionally or alternatively, as shown in FIG. 1B, the computing platform 104 may be configured to connect with the communications network 156 via a mobile device 152 instead of the TCU 180. The mobile device 152 may be any of various types of portable computing devices, such as cellular phones, tablet computers, smart watches, laptop computers, portable music players, or other devices capable of communication with the computing platform 104. In many examples, the computing platform 104 may include a wireless transceiver 150 (e.g., a Bluetooth module, a Zigbee transceiver, a Wi-Fi transceiver, an IrDA transceiver, an RFID transceiver, etc.) configured to communicate with a compatible wireless transceiver 154 of the mobile device 152. The wireless modules may transmit data at a carrier frequency or a center frequency. The center frequency is an important aspect of a wireless system by impacting noise immunity and bandwidth. For example, typical remote keyless entry systems operate at 315 MHz in the United States, and 433 MHz in Europe, while Wi-Fi and Bluetooth may operate at frequencies over 2 GHz. Additionally or alternatively, the computing platform 104 may communicate with the mobile device 152 over a wired connection, such as via a USB connection between the mobile device 152 and the USB subsystem 132.

The mobile device 152 may provide network connectivity to the communications network 156 via a device modem 158 of the mobile device 152. To facilitate the communications over the communications network 156, mobile device 152 may be associated with unique device identifiers (e.g., mobile device numbers (MDNs), Internet protocol (IP) addresses, and etc.) to identify the communications of the mobile device 152 over the communications network 156. In some cases, occupants of the vehicle 102 or devices having permission to connect to the computing platform 104 may be identified by the computing platform 104 according to paired device data 160 maintained in the storage medium 112. The paired device data 160 may indicate, for example, the unique device identifiers of mobile devices 152 previously paired with the computing platform 104 of the vehicle 102, such that the computing platform 104 may automatically reconnected to the mobile device 152 referenced in the paired device data 160 without user intervention.

When a mobile device 152 that supports network connectivity is paired with the computing platform 104, the mobile device 152 may allow the computing platform 104 to use the network connectivity of the device modem 158 to communicate over the communication network 156 with the remote telematics services 162. In one example, the computing platform 104 may utilize a data-over-voice plan or data plan of the mobile device 152 to communicate information between the computing platform 104 and the communications network 156. Additionally or alternatively, the computing platform 104 may utilize the TCU 180 to communicate information between the computing platform 104 and the communication network 156, without use of the communications facilities of the mobile device 152.

Similar to the computing platform 104, the mobile device 152 may include one or more processors 164 configured to execute instructions of mobile applications 170 loaded to a memory 166 of the mobile device 152 from storage medium 168 of the mobile device 152. In some examples, the mobile applications 170 may be configured to communicate with the computing platform 104 via the wireless transceiver 154 and with the remote telematics services 162 or other network services via the device modem 158. The computing platform 104 may also include a device interface 172 to facilitate the integration of functionality of the mobile applications 170 into the grammar of commands available via the voice interface 134. The device link interfaced 172 may also provide the mobile applications 170 with access to vehicle information available to the computing platform 104 via the in-vehicle networks 142. An example of a device link interface 172 may be the SYNC APPLINK component of the SYNC system provided by The Ford Motor Company of Dearborn, Mich.

Figure 2:
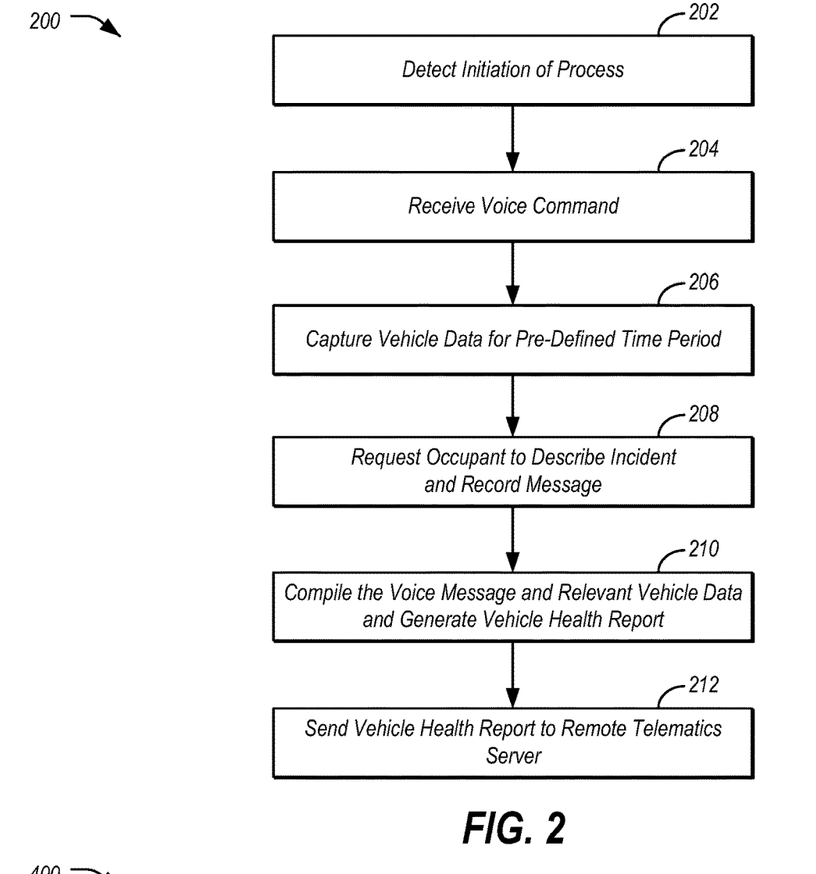
FIG. 2 illustrates an exemplary flow diagram of the method sending the vehicle health report of one embodiment of the present disclosure.

FIG. 2 illustrates an exemplary flow diagram of a process 200 for sending a vehicle health report 190. When a vehicle experiences a vehicle issue, such as a rough shift or an excessive engine shake, a vehicle occupant may decide to report this incident to find out the cause and prevent possible damage to the vehicle 102. The occupant, such as the driver, may initiate the process 200, for example, by pressing a button connected to the HMI control 136. It is noted that, in other examples, the process 200 may be initiate by other input, such as a voice command.

At operation 202, the computing platform 104 detects initiation of the process 200. Responsive to the detection, the computing platform 104 may launch a voice recognition vehicle application 110 from the storage 112, and activate audio input 114 to receive audio signals from a device connected thereto, such as the microphone 116. In an alternative example, the audio input 114 may be configured to received audio signals from other devices (not shown) connected to the AUX audio input 118. In an alternative example, the computing platform 104 may be configured to launch applications stored in the memory 166 and activate a sound input device (not shown) of a mobile device 152 to receive audio signals.

At operation 204, the computing platform 104 receives a voice command uttered by the driver or occupant. In an example, the voice command may be the phrase "send health report." The audio input may be received from the microphone 116, the AUX audio input 118, the mobile device 152 or any other sound input connected thereto. Using the vehicle application 110 and the voice interface 134, the computing platform 104 may recognize the voice command and launch a program to prepare to send the vehicle health report 190. It is noted that the voice command is only an example and other voice commands, or commands in English or other languages, may be used to invoke the reporting functionality.

At operation 206, the computing platform 104 captures the vehicle data for a pre-defined time period. In an example, the time period may include 30 seconds prior to invoking the reporting functionality through 15 seconds after invoking the reporting functionality. In another example, the time period includes up to 60 seconds before the initiation of the process, and up to 30 seconds after the initiation of the process. The computing platform 104 may store the data for the time period in the storage 112. In one example, the computing platform 104 may load previous vehicle data from ECUs 148 for the pre-defined time period and store it in the storage 112. Additionally, the computing platform 104 may allow for the ECUs 148 to collect the vehicle data for the pre-defined time period after the initiation of the process, and then load and store that additional data to the storage 112. In an alternative example, if the vehicle data has already been sent from ECUs 148 to the computing platform 104 via the in-vehicle network 142B in real time, the computing platform 104 may load it from the storage 112 directly while continuing to capture new vehicle data sent via the in-vehicle network 142B. It is noted that the length of time for capturing the vehicle data is only exemplary and any other relevant length of time may be used. In an alternative example, the computing platform 104 may only capture the vehicle data prior to the initiation of the process 200.

At operation 208, the computing platform 104 requests the occupant to describe the incident being reported. In an example, the computing platform 104 may make the request via the display 138 and/or the speaker 130, and may activate one of more of the microphone 116, AUX audio input 118 and/or the sound input of mobile device 152 connected thereto to record a voice message uttered by the occupant. For instance, the computing platform 104 may display a message such as "Please tell us what happened" on the display 138 to invite to occupant to orally provide more information about the incident. Additionally or alternatively, the computing platform 104 may output the message as speech via the speaker 130 so that the driver is not distracted by the display and can focus on the road as he/she continues driving. Alternatively, the same video or audio message may be output by the mobile device 152 connected to the computing platform 104 using wired or wireless techniques.

The computing platform 104 may record a voice message from the occupant via one or more of the microphone 116, AUX audio input 118, and/or the sound input of mobile device 152 connected thereto and store a digitized voice recording file in the storage 112. In many cases, only a short description is needed for technicians to understand the context of the incident being reported. As an example, the short voice message may be "I just had a rough transmission shift after driving through water about one-foot deep." Such message may be greatly helpful for the technicians to understand the driving condition of the vehicle and therefore facilitate a quick and accurate detection of the problem. In one example, the maximum length of the voice message may be limited to a predefined time period (e.g., 30 seconds) and the computing platform stops the recording after that time period has passed even if the driver is still talking. In one example, if the occupant finishes the message before the time limit, he/she may trigger an input of the HMI controls 136 to indicate to stop the recording. Additionally or alternatively, the computing platform 104 may automatically detect the end of the driver speech and automatically stop the recording.

It is noted that operation 206 does not have to be performed before operation 208. In one example, when the computing platform 104 detects the driver wants to send a vehicle health report 190, it may launch both operation 206 and operation 208 at substantially the same time. In other words, the computing platform 104 may load the vehicle data and store it in the storage 112, and meanwhile, record the voice message and store it in the storage 112 at substantially the same time. In an alternative example, operation 208 may be performed before the operation 206.

At operation 210, the computing platform 104 compiles the vehicle data and voice message both stored in the storage 112 using the processor 106 to generate a vehicle health report 190. The vehicle health report 190 may include a single or multiple files containing both the vehicle data and the voice message. Depending on the network connection of the vehicle 102, the computing platform 104 may store the generated vehicle health report 190 in the storage 112 when the network connection is not available and wait for the next available opportunity to send it out.

At operation 212, the computing platform 104 sends the vehicle health report 190 to the remote telematics services 162 via the communications network 156 using the TCU 180 or the mobile device 152, as appropriate. As an example, the computing platform 104 may delete the vehicle health report 190 after successfully sending it to the remote telematics services 162. Alternatively, the computing platform 104 may leave a copy of the vehicle health report 190 in the storage 112. After operation 212, the process 300 ends.

Figure 3:
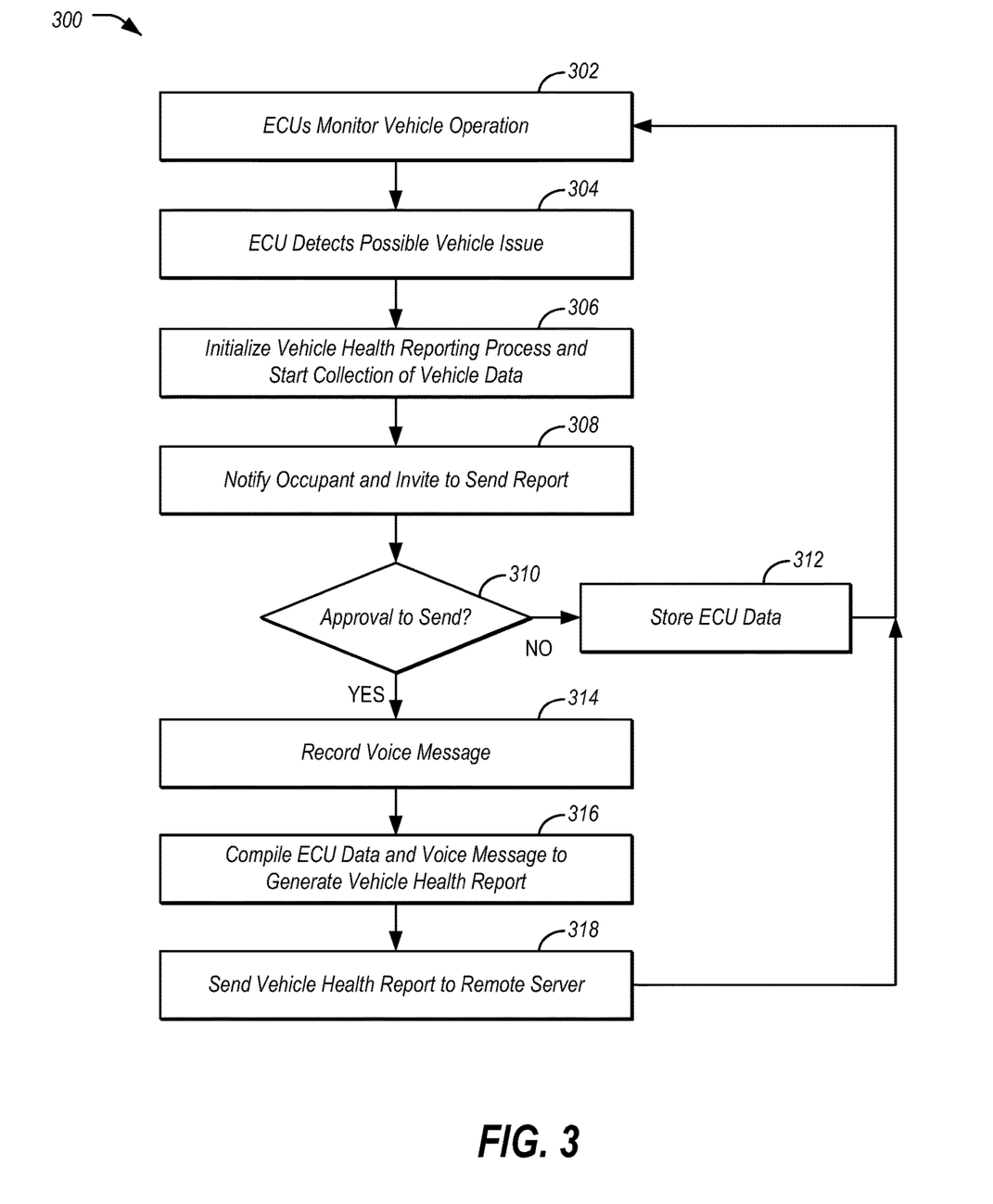
FIG. 3 illustrates an alternative exemplary flow diagram of the method sending the vehicle health report of one embodiment of the present disclosure.

FIG. 3 illustrates an alternate exemplary flow diagram of a process 300 for sending the vehicle health report 190. At operation 302, vehicle ECUs 148 monitor the operation of the vehicle 102 through various sensors connected thereto. The ECUs 148 may include processors and control circuits and can detect possible vehicle malfunctions (e.g., engine misfire, etc.).

At operation 304, at least one of the ECUs 148 detects a possible vehicle malfunction. As an example, a powertrain control module (which is one of the vehicle ECUs 148) may detect an engine misfiring in cylinder number 3 and trigger a P0303 diagnostic trouble code (DTC). The check engine light may automatically activate responsive to triggering of the DTC. Alternatively, when the misfiring is minor but detectable, the ECU 148 may not turn on the check engine light. In some cases, it may not even generate a DTC. However, the misfire may still be detected by sensors and the vehicle data may be recorded for analysis to prevent possible damage to the engine.

At operation 306, responsive to the ECUs 148 detecting a possible malfunction of the vehicle 102, the computing platform 104 initiates the vehicle health reporting process and starts to collect vehicle data from the ECUs 148 through the in-vehicle network 142B. In one example, the computing platform 104 may collect vehicle data for a pre-defined time period (e.g. the previous 30 seconds and the following 15 seconds) from the initiation of the process. To capture the data, the computing platform 104 may load the previous vehicle data from all ECUs 148 for the predefined time period and store it in the storage 112. Then, the computing platform 104 may wait for the ECUs 148 to collect the next vehicle data for the predefined time period after the initiation of the process and then load and store it in the storage 112. It is noted that the length of time for capturing the vehicle data is only an example, and any other relevant length of time may be used. In an alternative example, if the vehicle data has already been sent from ECUs 148 to the computing platform 104 via the in-vehicle network 142B in real time, the computing platform 104 may load it from the storage 112 directly while continuing to capture new vehicle data sent via the in-vehicle network 142. In an alternative example, only data from the ECU 148 reporting the possible malfunction is collected. That is to say, if the possible malfunction is engine misfiring, only data from the powertrain control module will be collected. In yet an alternative example, only data from the reporting ECU 148 and some other relevant ECUs 148 will be collected, but not data from all ECUs 148. For instance, if the powertrain control module generates a P0303 misfiring code, vehicle data from such powertrain control module will be collected; in addition, vehicle data from a transmission control unit which is very much related to the engine misfiring is also collected. Vehicle data from other ECUs 148 such as the body control module may not be collected to save storage space and avoid confusion.

After the detection of the possible vehicle malfunction, at operation 308, the computing platform 104 notifies an occupant, such as the driver, of the possible vehicle malfunction. The computing platform 104 may further invite the occupant to send a vehicle health report 190. In one example, the computing platform 104 may render a message on the display 138 to invite the occupant to report the incident. As an example, the message may be "Possible vehicle malfunction is detected. Would you like to report?" In an example using a touch screen display 138, a "Yes" and a "No" button may be displayed on the display 138 and the driver may decide whether he/she wants to report this incident. Additionally or alternatively, the computing platform 104 may output the same message via the speaker 130. Alternatively, the same text or audio message may be output by the mobile device 152 connected to the computing platform 104 using wired or wireless means.

At operation 310, the computing platform 104 waits for a response from the occupant. In one example, the occupant may press one of the buttons displayed on the touch screen display 138 to select "Yes" or "No." In an alternative example, the computer platform 104 may activate the microphone 116, AUX audio input 118, or the sound input on the mobile device 152 to allow the occupant to speak the answer. Using the voice recognition software and voice interface 134, the processor 106 may process the driver's response to determine whether "Yes" or "No" is selected.

If the computer platform 104 determines the occupant selected "No," at operation 312, the computer platform automatically stores the vehicle data collected at operation 306 in the storage 112 for future analysis. The computing platform 104 may then transfer control back to operation 302.

If the computer platform 104 determines that the occupant selected "Yes," the computing platform 104 may transfer control to operation 314. The computer platform 104 activates the microphone 116, AUX audio input 118, the sound input on the mobile device 152, or any sound input device connected thereto to record a voice message by the occupant. In one example, the maximum length of the voice message may be limited to a predefined time period (such as 30 seconds) and the computing platform 104 may discontinue the recording after that time period has passed. In one example, if the driver finishes the message before the time limit, he/she may use the HMI controls 136 or input to the touch screen 138 to request completion of the recording. Additionally or alternatively, the computing platform 104 may automatically detect the end of the driver speech and automatically stop the recording.

At operation 316, the computing platform 104 compiles the vehicle data and voice message both stored in the storage 112 using the processor 106 to generate a vehicle health report 190. The vehicle health report 190 may include a single or multiple files containing both the vehicle data and the voice message. Depending on the network connection of the vehicle 102, the computing platform 104 may store the generated vehicle health report 190 in the storage 112 when the network connection is not available and wait for the next available opportunity to send it out.

At operation 318, the computing platform 104 sends the vehicle health report 190 to the remote telematics services 162 via the communications network 156 using the TCU 180 or the mobile device 152, as appropriate. As an example, the computing platform 104 may delete the vehicle health report 190 after successfully sending it to the remote telematics services 162. Alternatively, the computing platform 104 may leave a copy of the vehicle health report 190 in the storage 112.

After operation 318, the computing platform 104 transfers control back to operation 302 and the vehicle ECUs 148 continue to monitor the operation of vehicle 102.

It is noted that if the vehicle 102 does have some malfunctions and ECUs 148 keeps detecting the malfunctions, only one vehicle health report 190 for that particular problem is needed in most cases. However, if the computing platform 104 continues to notify regarding the same issue, the notifications may frustrate the user. To address this issue, the computing platform 104 may create a table recording each incident to prevent any unwanted notification.

Figure 4:
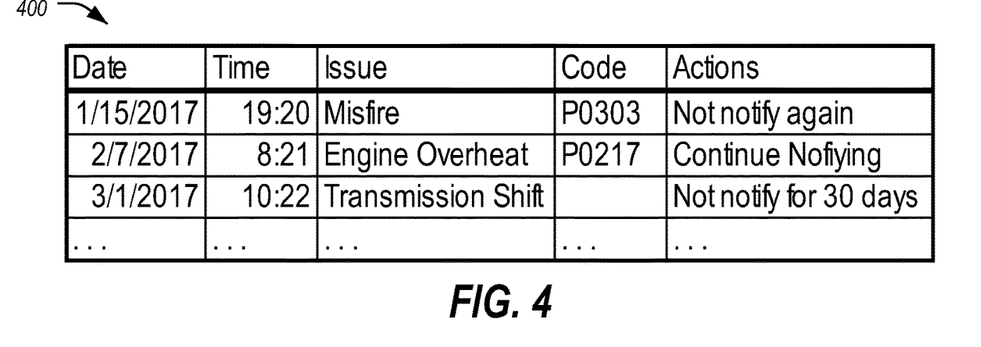
FIG. 4 illustrates an exemplary vehicle incident table stored in the storage.

FIG. 4 illustrates an example vehicle incident table 400. The vehicle incident table 400 may be created by the computing platform 104 and stored in the storage 112. The vehicle incident table 400 may include data columns including, but not limited to, date, time, issue, code, and actions. After the detection and handling of each incident, the incident is added to table 400 for future reference. For instance, after a misfiring code P0303 is detected by ECU 148 and addressed by the driver on Jan. 15, 2017 at 19:20, the relevant information is added to the table 400. Depending on the seriousness of the incident (e.g., determined according to the DTC that was detected, etc.), the computing platform 104 may identify what action to perform for the incident. As an example, the computing platform 104 may identify this is not a serious incident and no notification is needed until the next maintenance. If, however, the computing platform 104 determines the problem is serious, such as an overheating code P0217, computing platform 104 may identify to keep notifying the occupant of the issue, and request that the occupant stop the vehicle 102 and report the incident immediately. In some examples, the table 400 may be downloaded and cleared during vehicle 102 maintenance at a dealership.

Figure 5:
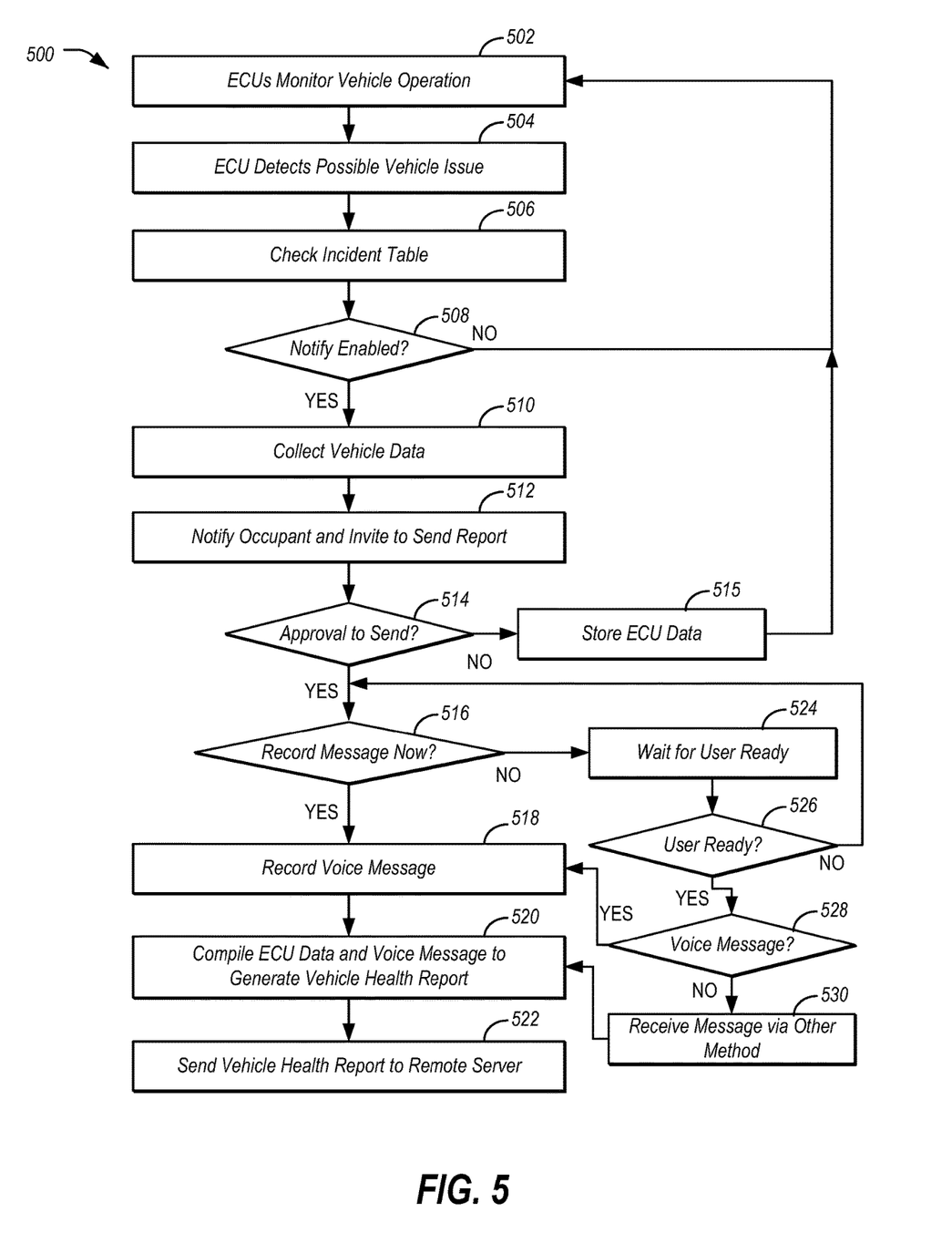
FIG. 5 illustrates a further alternative exemplary flow diagram of the method sending the vehicle health report of one embodiment of the present disclosure.

FIG. 5 illustrates another example flow diagram of the process 500 sending the vehicle health report 190. As compared to the process 300, in the process 500 the occupant may be provided an option to record the message at a later time.

At operation 502, vehicle ECUs 148 monitor the operation of the vehicle 102 through various sensors connected thereto. The ECUs 148 may include processors and control circuits and be capable of detecting possible vehicle malfunction such as engine misfire in one example.

At operation 504, at least one of the ECUs 148 detects a possible vehicle malfunction. As an example, the powertrain control module, which is one of the vehicle ECUs 148 may detect an engine misfiring in cylinder number 3 and trigger a P0303 diagnostic trouble code (DTC), the check engine light automatically turns on.

At operation 506, the computing platform 104 initiates the vehicle health reporting process and checks the vehicle incident table 400 stored in the storage 112 to determine if this possible malfunction has been found and addressed before. Taking the engine misfiring P0303 code for example, the computing platform 104 may identify, based on the vehicle incident table 400, that the same malfunction has already been detected. Accordingly, the computing platform 104 may not notify the occupant of the same incident again until the table is cleared. In such a case, the computing platform 104 may not notify the occupant of this incident, as shown in operation 508, and the computing platform 104 may transition back to operation 502.

If, however, the table 400 lacks an entry for the incident, then the computing platform 104 may elect to notify the occupant of current possible malfunction. If so, the computing platform 104 transitions control to operation 510. At operation 510, the computing platform 104 starts to collect vehicle data from the ECUs 148 through the in-vehicle network 142B. In one example, the computing platform 104 may collect the vehicle data for a pre-defined time period (e.g. the previous 30 seconds and the next 15 seconds) from the initiation of the process. In one example, the computing platform 104 may load the previous vehicle data from all ECUs 148 for the pre-defined time period and store it in the storage 112. Then the computing platform 104 waits for all the ECUs 148 to collect the next vehicle data for the predefined time period after the initiation of the process and then load and store it in the storage 112. It is noted that the length of time for capturing the vehicle data is only exemplary and any other relevant length of time may be used. In an alternative example, if the vehicle data has already been sent from ECUs 148 to the computing platform 104 via the in-vehicle network 142B in real time, the computing platform 104 may load it from the storage 112 directly while continuing to capture new vehicle data sent via the in-vehicle network 142. In an alternative example, only data from the ECU 148 reporting the possible malfunction is collected. That is to say, if the possible malfunction is engine misfiring, only data from the powertrain control module will be collected. In yet an alternative example, only data from the reporting ECU 148 and some other relevant ECUs 148 will be collected, but not data from all ECUs 148. For instance, if the powertrain control module generates a P0303 misfiring code, vehicle data from such powertrain control module will be collected; in addition vehicle data from a transmission control unit which is very much related to the engine misfiring is also collected. Vehicle data from other ECUs 148 such as the body control module may not be collected to save storage space and avoid confusion.

Responsive to the detection of the possible vehicle malfunction, at operation 512, the computing platform 104 notifies an occupant such as the driver of the possible vehicle malfunction and invites the occupant to send a vehicle health report 190. In one example, the computing platform 104 may pop up a message on the display 138 to invite the occupant to report the incident. As an example, the message may be "Possible vehicle malfunction detected. Would you like to report?" In case of touch screen display, a "Yes" and a "No" button may be displayed on the display 138 and the occupant may decide whether he/she wants to report this incident. Additionally or alternatively, the computing platform 104 may output the same message via the speaker 130 so that the driver is not distracted by the display and can focus on the road as he/she continues driving. Alternatively, the same text or audio message may be output by the mobile device 152 connected to the computing platform 104 using wired or wireless means.

At operation 514, the computing platform 104 may wait for response from the occupant. In one example, the occupant may use the touch screen display 138 to select "Yes" or "No." In an alternative example, the computer platform 104 may activate the microphone 116, AUX audio input 118, or the sound input on the mobile device 152 to allow the occupant to utter the answer orally. Using the voice recognition software, the processor 106 may process the occupant's response to determine whether "Yes" or "No" is selected.

If the computer platform 104 determines the occupant selected "No," at operation 515, the computer platform 104 automatically stores the vehicle data collected at operation 510 in the storage 112 for future analysis. No further action is taken, and control passes to operation 502.

If the computing platform 104 determines that the occupant selected Yes," control passes to operation 516 and the computing platform 104 further asks the occupant whether he/she wants to record the message now or later. As an example, the purpose of this option is that the occupant (especially as the driver) may prefer to focus on driving the vehicle 102 and it may be unsafe to be distracted to record the voice message. The occupant may want report the incident but prefer to record the message later after he/she reaches a safe place and parks the vehicle 102.

If the computing platform determines the occupant wants to record the message now, control passes to operation 518. The computing platform 104 activates the microphone 116, AUX audio input 118, the sound input on the mobile device 152, or any sound input device connected thereto to record a voice message by the occupant. In one example, the maximum length of the voice message is limited to 30 seconds and the computing platform stops the recording after that time period has passed even if the driver is still talking. In one example, if the occupant finished the message before the time limit, he/she may use the HMI controls 136 or input to the touch screen 138 to indicate to stop the recording. Additionally or alternatively, the computing platform 104 may automatically detect the end of the occupant speech and automatically stop the recording.

At operation 520, the computing platform 104 compiles the vehicle data and voice message both stored in the storage 112 using the processor 106 to generate a vehicle health report 190. The vehicle health report 190 may include a single or multiple files including both the vehicle data and the voice message. Depending on the network connection of the vehicle 102, the computing platform 104 may store the generated vehicle health report 190 in the storage 112 when the network connection is not available and wait for the next available opportunity to send it out.

At operation 522, the computing platform 104 sends the vehicle health report 190 to the remote telematics services 162 via the communications network 156 using the TCU 180 or the mobile device 152, as appropriate. As an example, the computing platform 104 may delete the vehicle health report 190 after successfully sending it to the remote telematics services 162. Alternatively, the computing platform 104 may leave a copy of the vehicle health report 190 in the storage 112.

If at operation 516, the computing platform 104 determines the occupant prefer to record the message later, control passes to operation 524 and the computing platform 104 may start to wait for the occupant input whenever he/she is ready.

At operation 526, if the computing platform 104 determines the occupant is not yet ready, control passes to operation 524 and continues waiting. If it is determined that the occupant is ready to record the message, control passes to operation 528. As an example, the occupant may use the HMI controls 136 to indicate he/she is ready to record a message. Alternatively, the occupant may use the touch screen display 138 or the audio input module 114 to indicate the same.

At operation 528, the computing platform 104 may further give the occupant options on how to record the message. As an example, the computing platform 104 may let the occupant to choose between recording a voice message or input a message using other means such as typing it in using the touch screen display 138 or the mobile device 152. Although a voice message is likely the most convenient way to record the message, some occupants may prefer to type the message due to reasons such as a language barrier. If the occupant chooses to record a voice message, control passes to operation 518. Otherwise, control passes to operation 530.

At operation 530, the occupant may input the message using other means such as keyboard displayed on the display 138 controlled by the HMI controls 136. Alternatively, the occupant may type a message using the mobile device 152. The message may be transferred to the processor 106 of the computing platform 104 for compiling at operation 520.

After operation 522, control returns to operation 502 and the vehicle ECUs 148 continue to monitor the operation of vehicle 102.

Computing devices described herein, such as the telematics controller 180, generally include computer-executable instructions where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Visual Basic, JavaScript, Python, JavaScript, Perl, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined not with reference to the above description, but with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method comprising:
collecting vehicle bus data from an electronic control unit;
receiving user input to initiate creation of a vehicle health report for describing a vehicle diagnostic event, wherein the vehicle bus data is collected within a time period within predefined proximity to the user in put;
recording a user message descriptive of a context of the diagnostic event; and
sending, by a telematics controller to a server, the vehicle health report including the user message and a subset of the vehicle bus data including a time of the user input.

2. The method of claim 1, further comprising compiling the vehicle bus data and the user message to generate the vehicle health report by the telematics controller.

3. The method of claim 1, further comprising receiving a voice command to trigger the recording of the user message.

4. The method of claim 1, wherein the predefined proximity includes data captured immediately before and immediately after the user input.

5. The method of claim 4, wherein the time period includes 60 seconds before the user input and 30 seconds after the user input.

6. The method of claim 1, further comprising:
connecting the telematics controller to a mobile device; and
transmitting the vehicle health report from the telematics controller to the mobile device,
wherein the vehicle health report is sent to the server using the mobile device.

7. A method for sending a vehicle health report, comprising:
monitoring an operation of a vehicle by an electronic control unit (ECU);
initiating a reporting process responsive to detecting a diagnostic message generated by the ECU;
collecting vehicle data from the ECU by a vehicle processor;
storing the vehicle data in a storage;
requesting a user to record a user message via a human machine interface (HMI);
recording the user message by an input device;
loading the vehicle data from the storage for a time period adjacent to initiating the reporting process responsive to completion of recording of the user message; and
sending the vehicle health report, including both the vehicle data and the user message, to a server by a communication device.

8. The method of claim 7, further comprising prompting via the HMI whether to record the user message to send the vehicle health report, or save the vehicle data and prompt to record the user message at a later time.

9. The method of claim 8, further comprising prompting via the HMI whether to record a voice message or a text message as the user message.

10. The method of claim 7, wherein the vehicle health report is sent to the server through a network using a telematics controller.

11. The method of claim 7, further comprising:
connecting the vehicle processor to a mobile device; and
transmitting the vehicle health report from the vehicle processor to the mobile device,
wherein the vehicle health report is sent to the server using the mobile device.

12. The method of claim 7, further comprising:
maintaining a vehicle incident table in the storage, the vehicle incident table including entries for previously reported diagnostic messages; and
canceling reporting of the diagnostic message responsive to the diagnostic message being indicated by the vehicle incident table as having been previously reported.

13. The method of claim 12, further comprising updating the vehicle incident table by the vehicle processor to include the diagnostic message.

14. A vehicle comprising:
a plurality of ECUs, in communication over a vehicle bus, configured to monitor operation of the vehicle; and
a processor in communication with the vehicle bus, programmed to send, to a server, a vehicle health report including a voice message recorded from a vehicle occupant descriptive of a context of a vehicle diagnostic event and a subset of vehicle bus data including a time of an issue input, wherein the voice message and the vehicle bus data are compiled within a time period within predefined proximity to the issue input to generate the vehicle health report.

15. The vehicle of claim 14, further comprising a communication device connected to the vehicle bus configured to send the vehicle health report generated by the processor to a server.

16. The vehicle of claim 14, wherein the vehicle bus is a control area network (CAN).

17. The vehicle of claim 14, further comprising an infotainment system connected to the vehicle bus, configured to communicate between the processor and occupants of the vehicle.

18. The vehicle of claim 14, further comprising a storage configured to store a vehicle incident table, wherein the processor is further programmed to check the incident table to decide whether to notify of a possible malfunction.

* * * * *